US008229521B2

(12) United States Patent
Kang et al.

(10) Patent No.: US 8,229,521 B2
(45) Date of Patent: Jul. 24, 2012

(54) HEAD SET DEVICE HAVING A ROTATABLE SPEAKER HOUSING

(75) Inventors: Hyo-Sung Kang, Gumi-si (KR); Sung-Sun Park, Gumi-si (KR); Young-Jun Jung, Daegu (KR); Yeong-Moo Ryu, Gumi-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1205 days.

(21) Appl. No.: 11/802,338

(22) Filed: May 22, 2007

(65) Prior Publication Data

US 2008/0051166 A1 Feb. 28, 2008

(30) Foreign Application Priority Data

Aug. 28, 2006 (KR) ........................ 10-2006-0081701

(51) Int. Cl.
*H04M 1/00* (2006.01)

(52) U.S. Cl. ............... 455/575.2; 455/569.1; 455/575.7; 455/567; 455/557; 455/41.2; 379/428.02; 379/430; 379/431; 381/74; 381/370; 381/379; 381/380

(58) Field of Classification Search ............... 455/575.2, 455/575.1, 569.1, 567, 557, 554.1, 90.3, 455/41.2, 575.7; 379/428.02, 430, 431, 433.03; 381/74, 370–380
See application file for complete search history.

(56) References Cited

U.S. PATENT DOCUMENTS

| | | | | |
|---|---|---|---|---|
| 4,585,089 A | | 4/1986 | Topholm | |
| 6,078,825 A | * | 6/2000 | Hahn et al. | 455/569.2 |
| 6,507,655 B1 | * | 1/2003 | Yoon | 379/430 |
| 7,570,777 B1 | * | 8/2009 | Taenzer et al. | 381/381 |
| 2003/0157972 A1 | * | 8/2003 | Bae | 455/568 |
| 2006/0093131 A1 | * | 5/2006 | Cooper | 379/431 |
| 2006/0120546 A1 | * | 6/2006 | Tanaka et al. | 381/315 |
| 2008/0080733 A1 | * | 4/2008 | Mei et al. | 381/379 |
| 2010/0128916 A1 | * | 5/2010 | Bradford et al. | 381/386 |

FOREIGN PATENT DOCUMENTS

| | | |
|---|---|---|
| CN | 2694630 | 4/2005 |
| DE | 3840393 | 6/1989 |
| EP | 1538815 | 6/2005 |
| KR | 10-2001-0053675 | 7/2001 |
| KR | 20-0406206 Y1 | 1/2006 |
| WO | WO 0055673 | 9/2000 |
| WO | WO 2005029911 | 3/2005 |

* cited by examiner

*Primary Examiner* — Shaima Q Aminzay
(74) *Attorney, Agent, or Firm* — Roylance, Abrams, Berdo & Goodman, L.L.P.

(57) ABSTRACT

A head set device includes an antenna housing, a speaker housing connected to the antenna housing while protruding from one face of the antenna housing, and a hinge device for rotatably combining the speaker housing to the antenna housing. The speaker housing rotates with respect to a rotation axis that extends outwardly from one face of the antenna housing. The antenna housing and the speaker housing are rotatably connected together using a hinge device, thereby allowing the user to selectively wear the head set device on either ear and thus facilitating the use of the head set device. Moreover, by including the sensing means and the signal generating means to sense the position of the speaker housing and generate the holding signal, the operation of the head set device may be prevented even if there is unintentional key manipulation during a user's carrying of the head set device, thereby preventing unnecessary consumption of the storage battery and thus allowing the efficient use of the storage battery having a limited capacity.

35 Claims, 7 Drawing Sheets

HEAD SET DEVICE HAVING A ROTATABLE SPEAKER HOUSING

CROSS REFERENCE TO RELATED PATENT APPLICATION

This application claims the benefit under 35 U.S.C. §119 (a) of an application entitled "Head Set Device" filed in the Korean Intellectual Property Office on Aug. 28, 2006 and assigned Serial No. 2006-81701, the entire contents of which are hereby incorporated by reference.

BACKGROUND OF THE INVENTION

1. Field of the Invention

The present invention generally relates to a head set device. More particularly, the present invention relates to a head set device including a hinge device.

2. Description of the Related Art

Generally, a head set is an auxiliary device for converting an audio signal output from an audio device to provide audio to a user, and converting a user's voice into an electric signal, if necessary, to enable recording through an audio device or transmission through a portable terminal while being worn on a user's head.

The head set is useful for users involving public relation services or serving customers through voice communication, like telemarketers or users who desire voice chatting over the Internet. The head set is manufactured as one body including a speaker unit for outputting audio and a microphone unit for converting a user's voice into an electric signal.

The use of a portable terminal that provides a mobile communication service, like voice communication, with other users or service providers to users is commonplace. As portable terminals begin to include multimedia functions, such as reproduction of music files and moving pictures and TV watching in addition to communication functions, it adopts a head set capable of performing short range wireless communication.

The head set capable of performing short range wireless communication includes an antenna for transmission and reception with the portable terminal and a microphone and a speaker device for inputting and outputting a voice signal. To use the head set, the user wears the head set while putting a housing accommodating the speaker device in the user's ear and positions a housing accommodating the microphone device closely to the user's mouth.

The head set has an asymmetrical shape due to the wearing state of the head set in which the speaker housing is put in the user's ear and the microphone housing is positioned closely to the user's mouth.

However, because the head set has an asymmetrical-shape, it is not easy to use because it can be worn on only one ear due to its shape. Moreover, when the user wears a pair of head sets on both ears, the user must check the left head set and the right head set at every wearing.

Accordingly, a need exists for a head set that is wearable on either ear.

SUMMARY OF THE INVENTION

Accordingly, an object of the present invention is to provide a head set device that may be worn on either ear.

Another object of the present invention is to provide a head set device that is easy to wear because it may be worn on a user-desired ear.

Furthermore, another object of the present invention is to provide a head set device in which an antenna housing and a speaker housing are combined using a hinge device such that only the antenna housing may be positioned in a desired direction when the head set is worn on a user.

According to one aspect of the present invention, a head set device includes an antenna housing, a speaker housing combined with the antenna housing while protruding from one face of the antenna housing, and a hinge device for rotatably connecting the speaker housing to the antenna housing. The speaker housing rotates with respect to a rotation axis that extends from one face of the antenna housing.

According to another aspect of the present invention, a head set device includes an antenna housing, a speaker housing connected to the antenna housing and protruding from one face of the antenna housing and rotating with respect to a rotation axis that extends from one face of the antenna housing, at least one key installed in the outer circumferential face of the antenna housing, and a signal generating means operating according to the position of the speaker housing sensed by a sensing means. When the speaker housing is in a preset position, the signal generating means generates a holding signal to block the input of a signal by the key.

Other objects, advantages and salient features of the invention will become apparent from the following detailed description, which, taken in conjunction with the annexed drawings, discloses exemplary embodiments of the invention.

BRIEF DESCRIPTION OF THE DRAWINGS

The above and other objects, features and advantages of the present invention will become more apparent from the following detailed description when taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

An exemplary embodiment of the present invention is described in detail with reference to the annexed drawings. In the following description, a detailed description of known functions and configurations incorporated herein has been omitted for conciseness.

Figure 1:
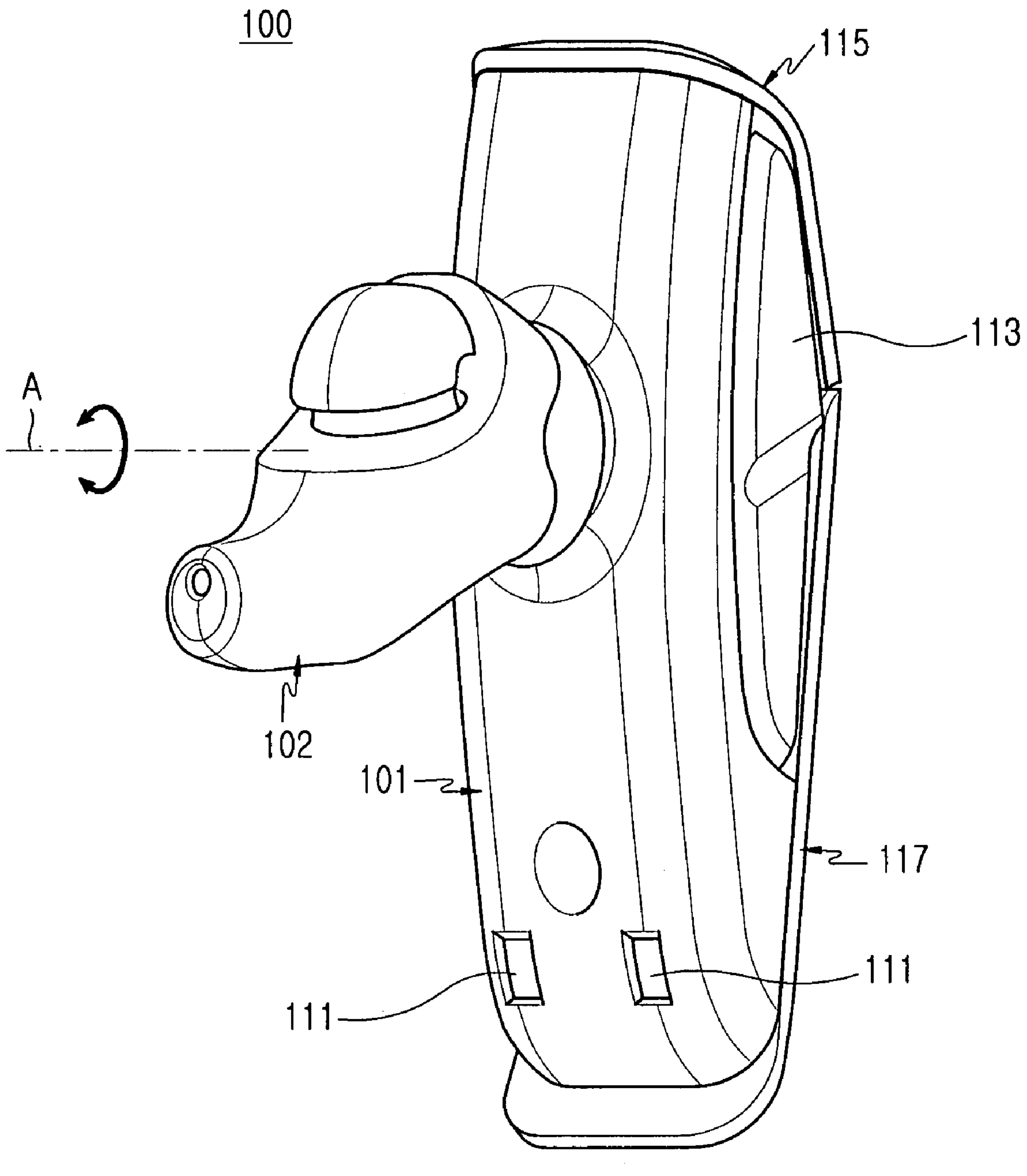
FIG. 1 is a perspective view of a head set device according to an exemplary embodiment of the present invention.
Figure 2:
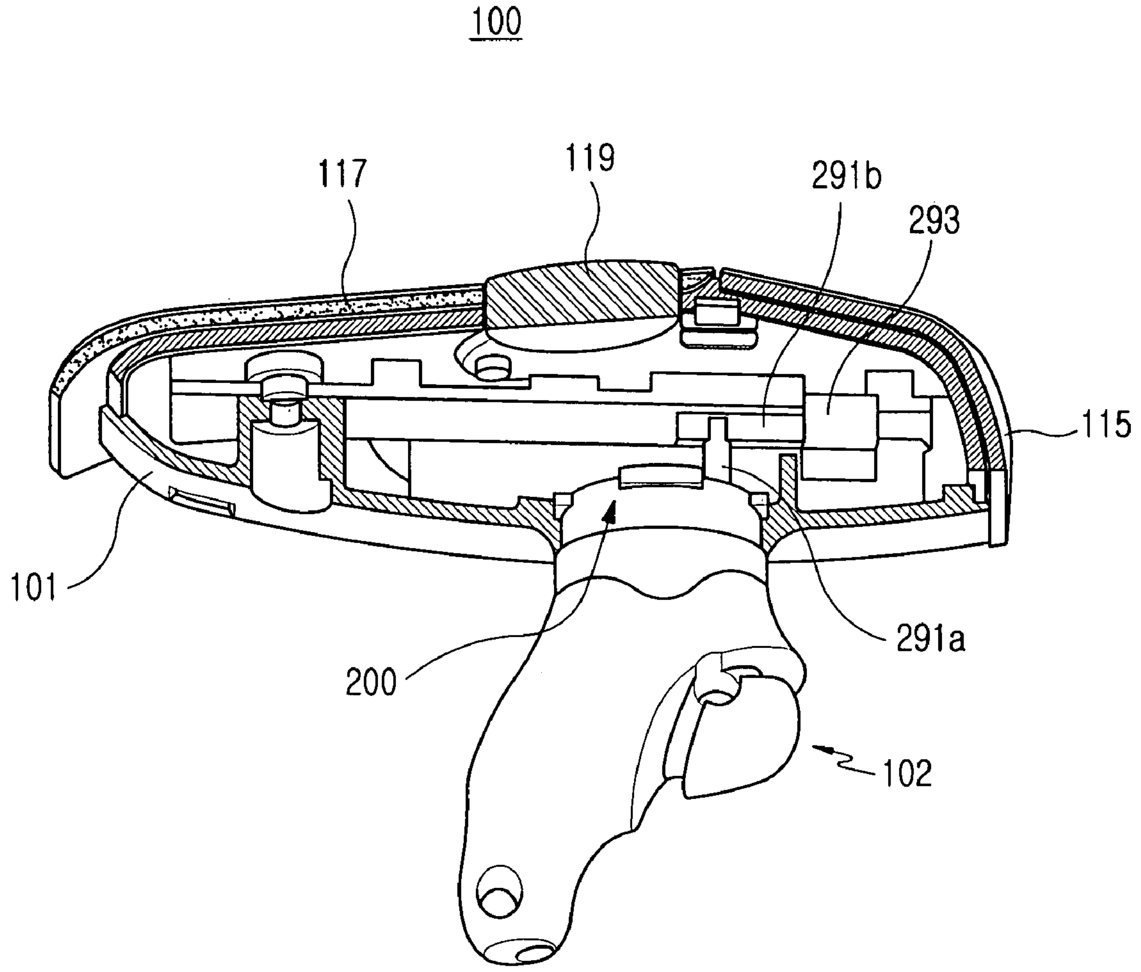
FIG. 2 is a perspective view in partial cross section of the head set device of FIG. 1.

As shown in FIGS. 1 and 2, a head set device 100 according to an exemplary embodiment of the present invention includes an antenna housing 101 and a speaker housing 102 that is rotatably connected to the antenna housing 101. The speaker housing 102, for example, may be connected to the antenna housing 101 through a hinge device 200.

Although not shown in the figures, a storage battery, an antenna device, and a microphone device may be accommodated in the antenna housing 101. The speaker housing 102 is inserted in the user's ear and is connected to one face of the antenna housing 101 and rotates with respect to a rotation axis A extending outwardly from one face of the antenna housing 101.

A charging terminal 111 is provided in one face of the antenna housing 101 and contacts an external charger to enable charging of the storage battery. A switch button 119 is provided in another face of the antenna housing 101 and generates an on/off signal for the power of the head set device 100 or a communication start/end signal for the portable terminal. Moreover, a volume adjustment key 113 is disposed in one side face of the antenna housing 101 to adjust a communication audio volume.

The speaker housing 102 includes a speaker unit (not shown) therein to output an audio signal generated by reproduction of a received voice signal or music files. Although the speaker housing 102 including a general speaker unit is provided to reproduce a voice signal in an exemplary embodiment of the present invention, a voice/audio output means using a bone conduction vibrator may also be used.

The head set device 100 may be worn by a user using a separate hook extending from the speaker housing 102. The hook preferably includes the bone conduction vibrator, thereby providing the voice/audio output means. When the voice/audio output means using the bone conduction vibrator is provided, the hook is connected to the antenna housing 101 through the speaker housing 102 and thus rotates with respect to the antenna housing 101 as the speaker housing 102 rotates, which is easily understood by those skilled in the art.

Figure 3:
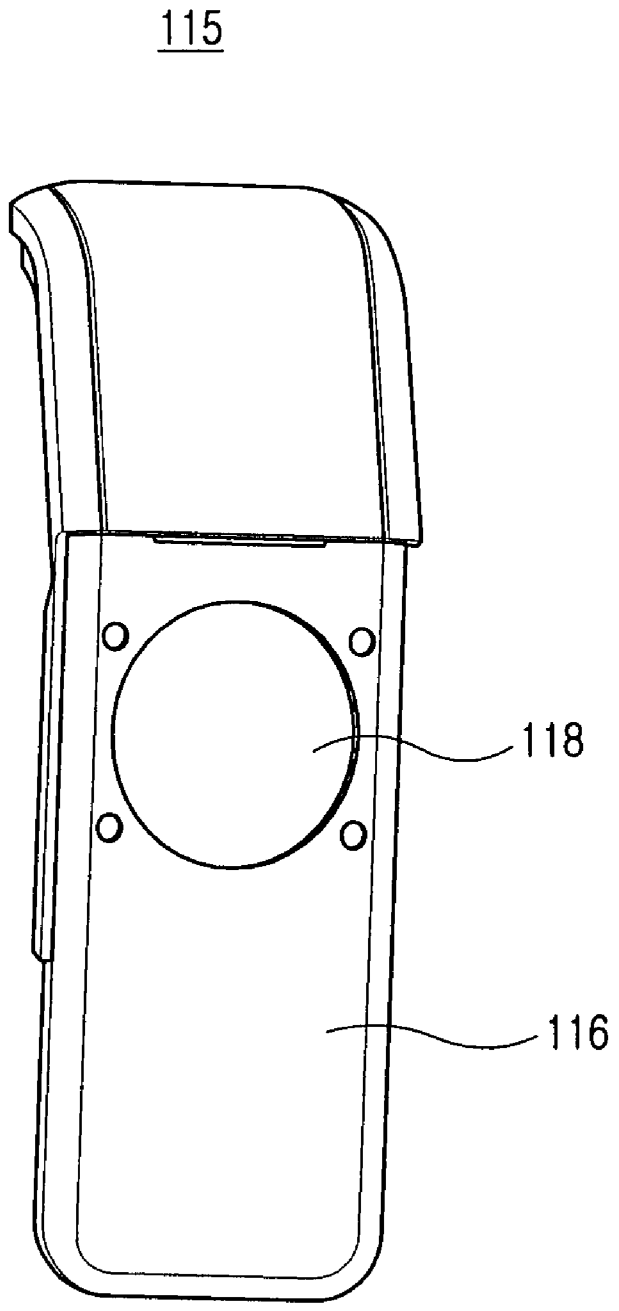
FIG. 3 is a perspective view of a cover of the head set device of FIG. 1.
Figure 4:
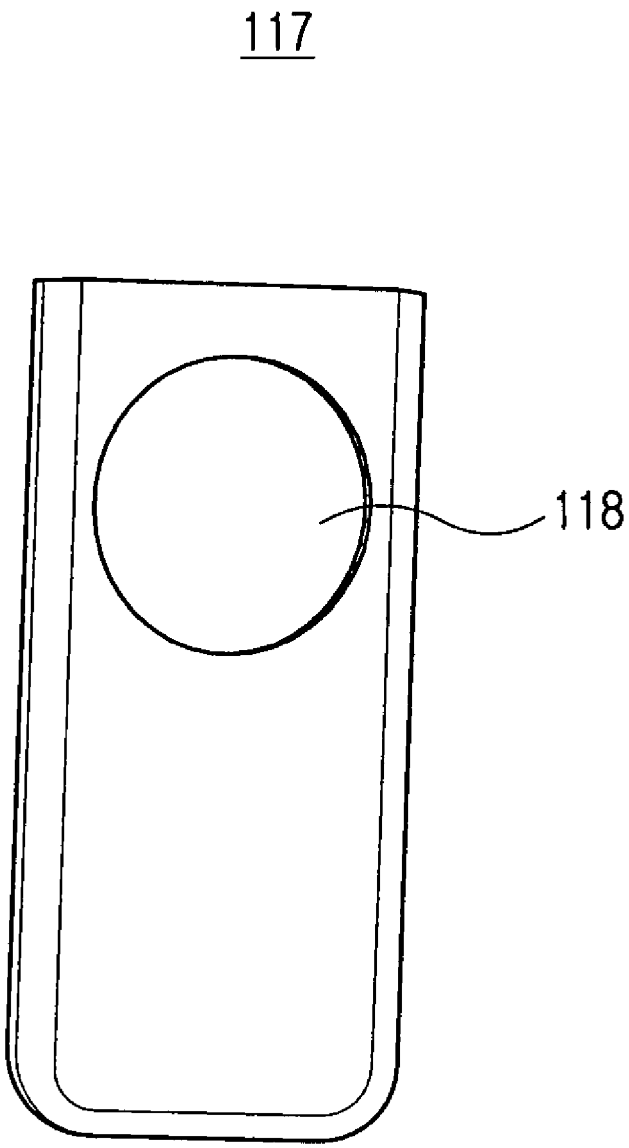
FIG. 4 is a perspective view of a dummy cover of the head set device of FIG. 1.
Figure 5:
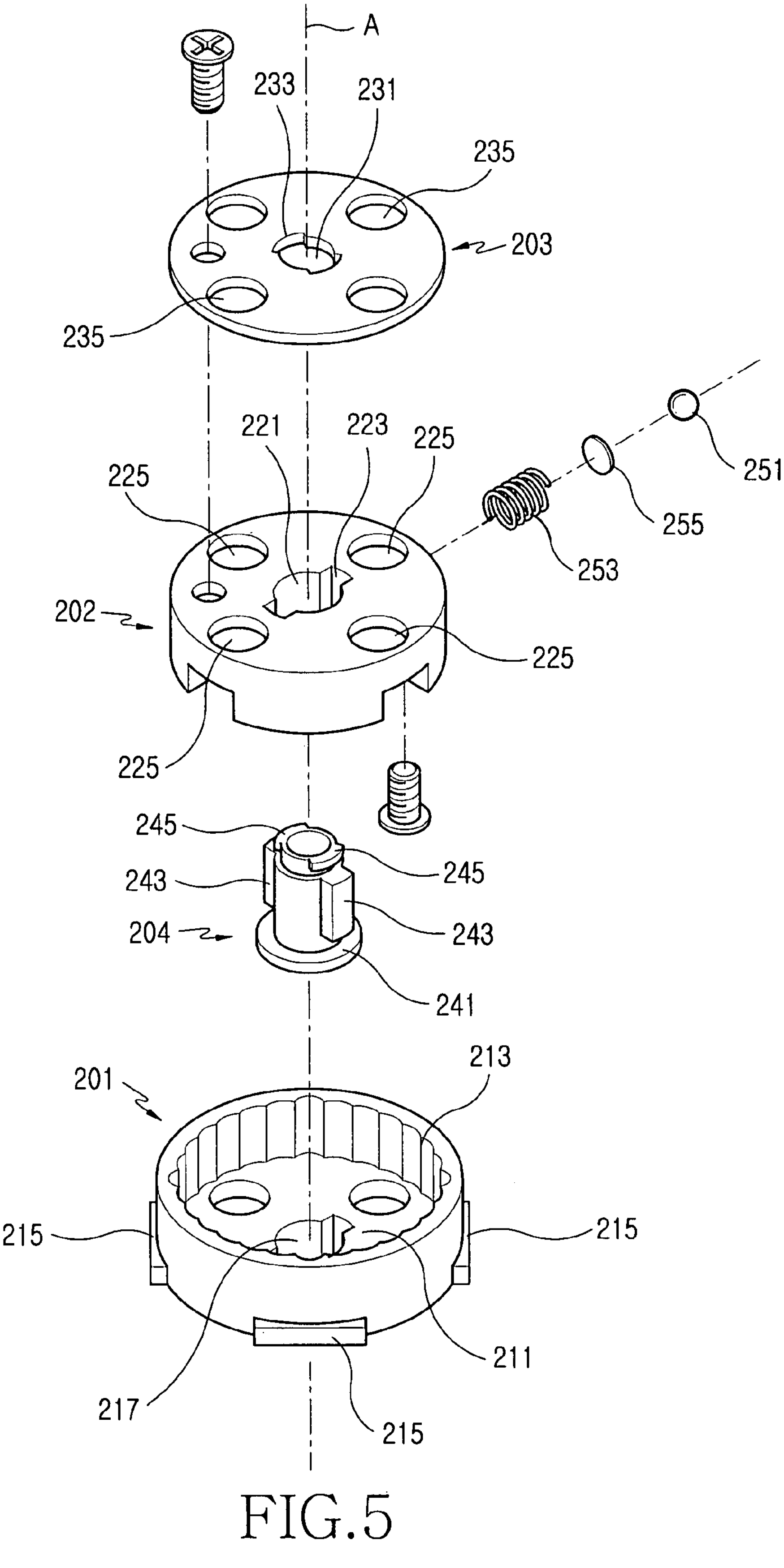
FIG. 5 is an exploded perspective view of a hinge device of the head set device of FIG. 1.

A cover 115 is coupled to a face of the antenna housing 101 to improve the design of the head set device 100. A step face 116 (FIG. 3) is formed on the outer side face of the cover 115 to be combined with a dummy cover 117 (FIG. 4), thereby diversifying the design of the cover 115. Additionally, the dummy cover 117 is removable to be replaced directly by the user.

Through holes 118 are formed in the cover 115 (FIGS. 2 and 3) and the dummy cover 117 (FIGS. 2 and 4) and overlap with each other to connect the inside and the outside of the antenna housing 101 when the dummy cover 117 is combined with the cover 115. The through holes 118 provide a space in which the switch button 119 is installed.

Hereinafter, the structure of the hinge device 200 is described in detail with reference to FIGS. 5 through 8.

As shown in FIGS. 5 through 8, the hinge device 200 includes a fixing unit 201 and a rotating unit 202.

Figure 6:
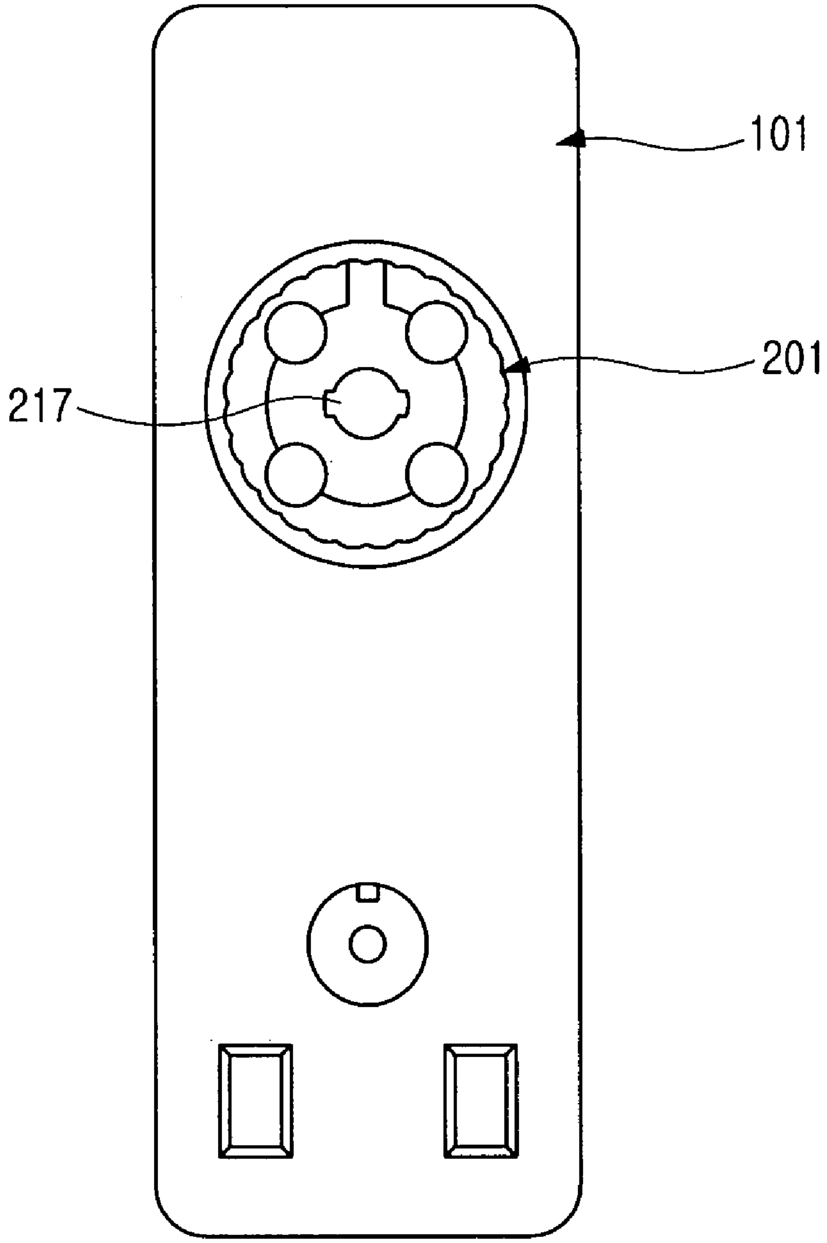
FIG. 6 is a top plan view of a fixing unit of the hinge device of FIG. 1 connected to an antenna housing.
Figure 7:
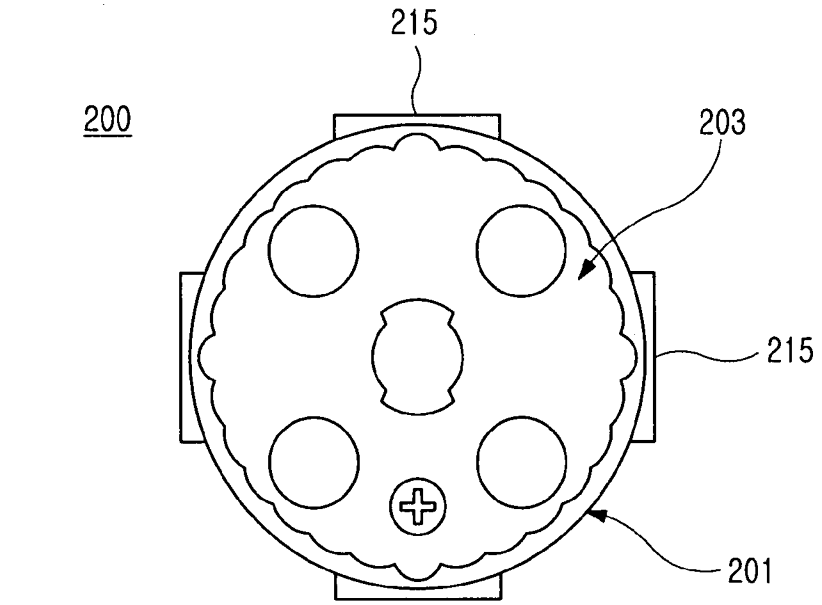
FIG. 7 is a top plan view of the assembled head set device of FIG. 5.
Figure 8:
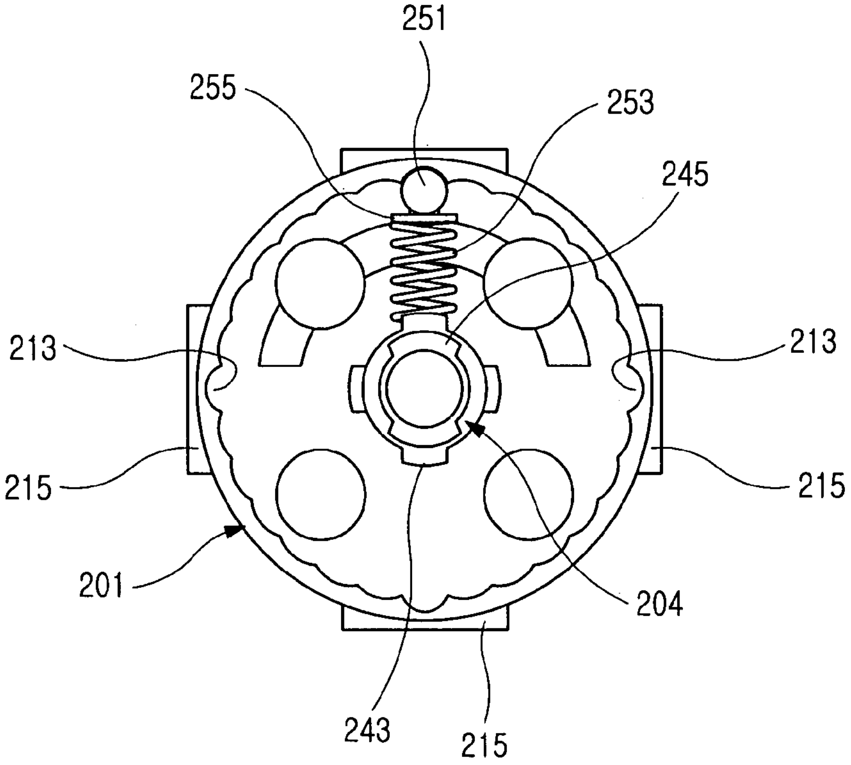
FIG. 8 is a top plan view of a click structure of the head set device of FIG. 5.

The fixing unit 201 has a cylindrical shape and one face that is depressed to provide an accommodating space 211. The fixing unit 201 is fixed in the antenna housing 101. Referring to FIGS. 2 and 6, at least one engaging part 215 is formed in the outer circumferential face of the fixing unit 201 to be engaged in the inner circumferential face of the antenna housing 101 by interference fit. The engaging part 215 is engaged in the inner circumferential face of the antenna housing 101, whereby the fixing unit 201 is fixed in the antenna housing 101 and the accommodating space 211 is exposed outside of the antenna housing 101. The fixing unit 201 may be fixed in the antenna housing 101 using an interference fit method, a latch method using a hook, or a bonding method.

The fixing unit 201 includes a supporting shaft hole 217 penetrating the antenna housing 101 from the accommodating space 211 and click recesses 213 formed in an inner wall of the accommodating space 211. The supporting shaft hole 217 provides a space that is penetrated by a supporting shaft 204 for connecting the rotating unit 202. The click recesses 213 extend in the direction of the rotation axis A and are arranged along the circumferential direction of the fixing unit 201.

The rotating unit 202 is accommodated in the accommodating space 211 of the fixing unit 201 and rotates with respect to the rotation axis A. A click ball 251 is installed in the rotating unit 202 to be urged inwardly or outwardly from the outer circumferential face of the rotating unit 202. The click ball 251 is supported by an elastic member 253 accommodated in the rotating unit 202 and is provided with an elastic force that works in a direction to protrude from the outer circumferential face of the rotating unit 202. Thus, when the rotating unit 202 rotates in the accommodating space 211, the click ball 251 is sequentially engaged with the click recesses 213 while being run against the inner wall of the accommodating space 211. The user feels a sense of clicking with rotation of the rotating unit 202 by a shock generated when the click ball 251 is engaged with one of the click recesses 213.

When the click ball 251 is supported by the elastic member 253, a washer plate 255 is disposed between the click ball 251 and the elastic member 253 to enable the click ball 251 to smoothly rotate on the rotating unit 202.

To define the rotating unit 202 in the fixing unit 201, the hinge device 200 includes the supporting shaft 204 and a dummy plate 203. The rotating unit 202 includes a first combining hole 221 and a supporting groove 223 to rotate along the supporting shaft 204. The first combining hole 221 penetrates both faces of the rotating unit 202 along the rotation axis A and the supporting groove 223 is formed in the inner circumferential face of the first engaging hole 221 and extends in the direction of the rotation axis A.

The supporting shaft 204 extends in the direction of the rotation axis A and includes a supporting rib 241 extending to the outside in the diameter direction from the outer circumferential face of one end of the supporting shaft 204, first supporting protrusions 243 extending from a portion of the outer circumferential face of the supporting shaft 204 in the direction of the rotation axis A while protruding from the outer circumferential face of the supporting shaft 204, and second supporting protrusions 245 extending to the outside from the outer circumferential face of the other end of the supporting shaft 204.

When the supporting shaft 204 is connected to the fixing unit 201 through the supporting hole 217 from the outside of the fixing unit 201, the supporting rib 241 is supported by the outer side face of the fixing unit 201. When the rotating unit 202 is positioned in the accommodating space 211 where the supporting shaft 204 is connected to the fixing unit 201, the supporting shaft 204 penetrates the first combining hole 221 and the first supporting protrusions 243 are positioned in the supporting groove 223.

The rotating unit 202 and the supporting shaft 204 are secured together by the supporting groove 223 and the first supporting protrusions 243, thereby rotating together on the fixing unit 201. The supporting shaft 204 also rotates with respect to the rotation axis A on the fixing unit 201.

When the rotating unit 202 and the supporting shaft 204 are connected together, the second supporting protrusions 245 protrude from the outer side face of the rotating unit 202 and are supported by one face of the dummy plate 203. The dummy plate 203 includes a second combining hole 231 penetrating the center of the dummy plate 203 and a dummy hole 233 whose portion extends to the outside of the second combining hole 231 from the outer circumference of the second combining hole 231. The other end of the supporting shaft 204 penetrates the dummy plate 203 through the second combining hole 231. The second supporting rib 245 penetrates the dummy hole 233. After the second supporting rib 245 penetrates the dummy hole 233, the second combining hole 231 is positioned by rotating the dummy plate 203 such that the circumference of the second combining hole 231 is matched to the second supporting rib 245 and the dummy plate 203 is fixed to the rotating unit 202 using a screw, thereby securing the supporting shaft 204 in such a way to substantially prevent the supporting shaft 204 from deviating from the rotating unit 202.

The supporting rib 241 formed at one end of the supporting shaft 204 is supported by the outer side face of the fixing unit 201 and the second supporting protrusions 245 are supported by the outer side face of the dummy plate 203 such that the supporting shaft 204 penetrates the rotating unit 202 and the dummy plate 203, thereby securing the fixing unit 201 and the rotating unit 202 together. The rotating unit 202 rotates with respect to the fixing unit 201 while being secured thereto by the supporting shaft 204.

A plurality of engaging holes 225 are formed in the rotating unit 202 and a plurality of engaging holes 235 are formed in the dummy plate 203. Screws engaged with the engaging holes 225 from the inner side of the rotating unit 202 fix the rotating unit 202 to the speaker housing 102.

The rotating unit 202 and the fixing unit 201 are secured together by the supporting shaft 204 in such a way to rotate with respect to each other when the rotating unit 202 is fixed to the speaker housing 102 and the fixing unit 201 is fixed to the antenna housing 101, thereby rotatably combining the speaker housing 102 and the antenna housing 101.

In the head set device 100 in which the speaker housing 102 and the antenna housing 101 are rotatably connected together, the user may recognize the degree of rotation of the speaker housing 102 by a shock or noise generated by the click ball 251 and the click recesses 213 without a check with user's eyes. When the click ball 251 is engaged in one of the click recesses 213, rotation of the speaker housing 102 with respect to the antenna housing 101 is restricted, whereby the stationary state of the speaker housing 102 is stably maintained. The user adjusts the position of the antenna housing 101 by rotating the antenna housing 101 when the speaker housing 102 is inserted in the user's ear. Thus, the user may be provided with a stable use environment when the user wears the head set device 100 on either ear.

Sensing means 291*a* and 291*b* for sensing rotation of the speaker housing 102 and a signal generating means 293 for generating an electric signal corresponding to the rotation are formed in the antenna housing 101.

Referring to FIG. 2, links are installed as the sensing means 291*a* and 291*b* and a detector switch, such as SSCM1101000 from ALPS Electric Co., Ltd., is used as the signal generating means 293. The links as the sensing means 291*a* and 291*b* move with rotation of the speaker housing 102 and the detector switch as the signal generating means 293 operates with movement of the sensing means 291*a* and 291*b*.

When the speaker housing 102 is in a stationary state in its initial position (see FIG. 1), the signal generating means 293 generates a holding signal to prevent the head set device 100 from operating even if the switch button 119 or the volume adjustment key is manipulated. The sensing means 291*a* and 291*b* and the signal generating means 293 prevent the head set device 100 from operating due to unintentional manipulation of the switch button 119 or the volume adjustment key 113 when the user simply carries the head set device 100. Thus, it is possible to prevent the storage battery of the head set device 100 from being discharged early.

A portable case for keeping the head set device 100 may be provided such that the head set device 100 is placed in the portable case after the speaker housing 102 is fixed to its initial position and the power is turned off, thereby restricting rotation of the speaker housing 102 and thus preventing unnecessary consumption of the storage battery.

It may be easily understood by those skilled in the art that hall sensors for sensing the opening and closing of a folder-type terminal as well as links for operating a sensing switch by interworking with movement of the speaker housing 102, may be used as the sensing means 291*a* and 291*b*.

As described above, according to the present invention, the antenna housing and the speaker housing are rotatably connected together using a hinge device, thereby allowing the user to selectively wear the head set device on either ear and thus facilitating the use of the head set device. Moreover, by including the sensing means and the signal generating means to sense the position of the speaker housing and generate the holding signal, the operation of the head set device may be prevented even if there is unintentional key manipulation during user's carrying of the head set device, thereby preventing unnecessary consumption of the storage battery and thus allowing the efficient use of the storage battery having a limited capacity.

While the present invention have been shown and described with reference to an exemplary embodiment thereof, it will be understood by those skilled in the art that various changes in form and details may be made therein without departing from the spirit and scope of the invention.

What is claimed is:

1. A head set device, comprising:
an antenna housing;
a speaker housing rotatably connected to a first face of the antenna housing and protruding from the first face of the antenna housing; and
a hinge device for rotatably connecting the speaker housing to the antenna housing, such that the hinge device rotates within the speaker housing and the speaker housing rotates with respect to a rotation axis extending outwardly from the first face of the antenna housing;
wherein the speaker housing is inserted in one of the user's ears.

2. The head set device of claim 1, further comprising a cover attached to a second face of the antenna housing.

3. The head set device of claim 1, further comprising a switch button attached to the second face of the antenna housing.

4. The head set device of claim 1, further comprising a volume adjustment key provided in a side face of the antenna housing.

5. A head set device, comprising:
an antenna housing;
a speaker housing connected to the antenna housing and protruding from a first face of the antenna housing; and
a hinge device for rotatably connecting the speaker housing to the antenna housing, such that the hinge device rotates within the speaker housing and the speaker housing rotates with respect to a rotation axis extending outwardly from the first face of the antenna housing;
wherein the hinge device comprises
a cylindrical fixing unit fixed to the antenna housing; and
a rotating unit accommodated in the fixing unit and rotating with respect to the rotation axis, and the speaker housing being fixed to the rotating unit.

6. The head set device of claim 5, wherein the hinge device further comprises a supporting shaft that has a first end supported by the outer side face of the fixing unit and extends to the inner side of the fixing unit in the direction of the rotation axis, wherein the rotating unit is connected to the supporting shaft to rotate with respect to the fixing unit.

7. The head set device of claim 6, wherein the hinge device further comprises:

a first combining hole formed to penetrate the center of the rotating unit;

a supporting groove extending from the inner wall of the first combining hole; and first supporting protrusions protruding from the outer circumferential face of the supporting shaft such that the rotating unit rotates together with the supporting shaft with respect to the fixing unit.

8. The head set device of claim 7, wherein the hinge device further comprises:

a dummy plate mounted to the outer side face of the rotating unit;

a second combining hole formed to penetrate the center of the dummy plate;

a dummy hole whose portion extends to the outside of the second combining hole from the outer circumference of the second combining hole; and second supporting protrusions extending to the outside from the outer circumferential face of a second end of the supporting shaft, wherein when the second supporting protrusions penetrate the dummy plate through the dummy hole and then rotate the dummy plate to fix the dummy plate to the rotating unit, the supporting shaft is bound by the rotating unit.

9. The head set device of claim 8, wherein the dummy plate is fixed to the rotating unit by a fastener.

10. The head set device of claim 6, wherein the hinge device further comprises a supporting rib extending to the outside from the outer circumferential face of one end of the supporting shaft and supported by the outer circumferential face of the fixing unit.

11. The head set device of claim 5, wherein the hinge device further comprises:

a plurality of click recesses formed in the inner wall of the fixing unit along the circumferential direction of the fixing unit; and a click ball disposed to be urged toward and away from the outer circumferential face of the rotating unit, wherein the click ball generates a sense of clicking by being sequentially run against the click recesses with the rotation of the rotating unit and is engaged with one of the click recesses, thereby restricting rotation of the rotating unit.

12. The head set device of claim 11, wherein the hinge device further comprises an elastic member disposed in the rotating unit, wherein the elastic member provides an elastic force that works in a direction to urge the click ball away from the outer circumferential face of the rotating unit.

13. The head set device of claim 5, wherein the hinge device further comprises at least one engaging part protruding from the outer circumferential face of the fixing unit, wherein the engaging part is engaged in the inner circumferential face of the antenna housing to secure the fixing unit to the antenna housing.

14. The head set device of claim 5, wherein the hinge device further comprises an accommodating space formed depressed in one face of the fixing unit to accommodate the rotating unit, wherein as the fixing unit is fixed to the antenna housing, the accommodating space is exposed outside of the antenna housing.

15. A head set device, comprising:

an antenna housing;

a speaker housing connected to the antenna housing and protruding from a first face of the antenna housing;

a hinge device for rotatably connecting the speaker housing to the antenna housing, such that the hinge device rotates within the speaker housing and the speaker housing rotates with respect to a rotation axis extending outwardly from the first face of the antenna housing;

at least one key installed in the outer circumferential face of the antenna housing;

sensing means for sensing rotation of the speaker housing; and a signal generating means operating according to the position of the speaker housing sensed by the sensing means;

wherein when the speaker housing is in a preset position, the signal generating means generates a holding signal to block the input of a signal by the key.

16. The head set device of claim 15, wherein the sensing means are hall sensors.

17. The head set device of claim 15, wherein the sensing means are links that operate the signal generating means in response to rotation of the rotating unit.

18. A head set device, comprising:

an antenna housing; and a speaker housing rotatably connected to a first face of the antenna housing and protruding from the first face of the antenna housing;

wherein the speaker housing is inserted in one of the user's ears and the rotation of the speaker housing with respect to the antenna housing allows the head set device to be used with either ear.

19. The head set device of claim 18, wherein a hinge device rotatably connects the speaker housing to the antenna housing such that the speaker housing rotates with respect to a rotation axis extending outwardly from the first face of the antenna housing.

20. The head set device of claim 18, wherein a cover is attached to a second face of the antenna housing.

21. The head set device of claim 18, wherein a switch button is attached to the second face of the antenna housing.

22. The head set device of claim 18, further comprising a volume adjustment key provided in a side face of the antenna housing.

23. A head set device, comprising:

an antenna housing;

a speaker housing rotatably connected to the antenna housing and adapted to be received by one of the user's ears; and a hinge device rotatably connecting the speaker housing to the antenna housing to allow the head set device to be used with either ear such that the speaker housing rotates with respect to a rotation axis extending outwardly from a first face of the antenna housing;

wherein the hinge device comprises:

a cylindrical fixing unit fixed to the antenna housing; and a rotating unit accommodated in the fixing unit and rotating with respect to the rotation axis, and the speaker housing being fixed to the rotating unit.

24. The head set device of claim 23, wherein the hinge device further comprises a supporting shaft that has a first end supported by an outer side face of the fixing unit and extending to the inner side of the fixing unit in the direction of the rotation axis, wherein the rotating unit is connected to the supporting shaft to rotate with respect to the fixing unit.

25. The head set device of claim 24, wherein the hinge device further comprises:

a first combining hole formed to penetrate the center of the rotating unit;

a supporting groove extending from the inner wall of the first combining hole; and first supporting protrusions protruding from the outer circumferential face of the supporting shaft such that the rotating unit rotates together with the supporting shaft with respect to the fixing unit.

26. The head set device of claim 25, wherein the hinge device further comprises:

a dummy plate mounted to the outer side face of the rotating unit;

a second combining hole formed to penetrate the center of the dummy plate;

a dummy hole whose portion extends to the outside of the second combining hole from the outer circumference of the second combining hole; and second supporting protrusions extending to the outside from the outer circumferential face of a second end of the supporting shaft, wherein when the second supporting protrusions penetrate the dummy plate through the dummy hole and then rotate the dummy plate to fix the dummy plate to the rotating unit, the supporting shaft is bound by the rotating unit.

27. The head set device of claim 26, wherein the dummy plate is fixed to the rotating unit by a fastener.

28. The head set device of claim 24, wherein the hinge device further comprises a supporting rib extending to the outside from the outer circumferential face of one end of the supporting shaft and supported by the outer circumferential face of the fixing unit.

29. The head set device of claim 23, wherein the hinge device further comprises:

a plurality of click recesses formed in the inner wall of the fixing unit along the circumferential direction of the fixing unit; and a click ball disposed to be urged toward and away from the outer circumferential face of the rotating unit, wherein the click ball generates a sense of clicking by being sequentially run against the click recesses with the rotation of the rotating unit and is engaged with one of the click recesses, thereby restricting rotation of the rotating unit.

30. The head set device of claim 29, wherein the hinge device further comprises an elastic member disposed in the rotating unit, wherein the elastic member provides an elastic force that works in a direction to urge the click ball away from the outer circumferential face of the rotating unit.

31. The head set device of claim 23, wherein the hinge device further comprises at least one engaging part protruding from the outer circumferential face of the fixing unit, wherein the engaging part is engaged in the inner circumferential face of the antenna housing to secure the fixing unit to the antenna housing.

32. The head set device of claim 23, wherein the hinge device further comprises an accommodating space formed depressed in one face of the fixing unit to accommodate the rotating unit, wherein as the fixing unit is fixed to the antenna housing, the accommodating space is exposed outside of the antenna housing.

33. A head set device, comprising:

an antenna housing;

a speaker housing rotatably connected to the antenna housing and adapted to be received by a user's ear;

at least one key installed in the outer circumferential face of the antenna housing;

sensing means for sensing rotation of the speaker housing; and a signal generating means operating according to the position of the speaker housing sensed by the sensing means;

wherein the rotation of the speaker housing with respect to the antenna housing allows the head set device to be used with either ear and when the speaker housing is in a preset position, the signal generating means generates a holding signal to block the input of a signal by the key.

34. The head set device of claim 33, wherein the sensing means are hall sensors.

35. The head set device of claim 33, wherein the sensing means are links that operate the signal generating means in response to rotation of the rotating unit.

* * * * *